United States Patent [19]

Ota

[11] 4,372,178
[45] Feb. 8, 1983

[54] OPERATING FORCE TRANSMITTING APPARATUS

[75] Inventor: Shingo Ota, Komatsu, Japan

[73] Assignee: Kabushiki Kaisha Komatsu Seisakusho, Tokyo, Japan

[21] Appl. No.: 125,588

[22] Filed: Feb. 28, 1980

[51] Int. Cl.³ .............................................. G05G 1/14
[52] U.S. Cl. ....................................... 74/512; 74/516
[58] Field of Search ......................... 74/512, 516, 518

[56] References Cited

U.S. PATENT DOCUMENTS

| 705,304 | 7/1902 | Sangster | 74/512 |
|---|---|---|---|
| 1,754,354 | 4/1930 | Gans | 74/512 |
| 1,808,121 | 6/1931 | Smith | 74/516 |
| 2,021,859 | 11/1935 | Jarvis | 74/512 |
| 2,112,607 | 3/1938 | Pooley | 74/516 |

FOREIGN PATENT DOCUMENTS 333557 9/1930 United Kingdom ................. 74/512

Primary Examiner—Kenneth Dorner
Attorney, Agent, or Firm—Armstrong, Nikaido, Marmelstein & Kubovcik

[57] ABSTRACT

An operating force transmitting apparatus adapted to be used for brake or clutch operation of a vehicle which is capable of reducing required operating force. The apparatus comprises a pair of brackets fixedly secured to a vehicle frame, a first shaft mounted on said pair of brackets, a first cylinder rotatably mounted on the first shaft, the first cylinder having an operating member and a lever fixedly secured thereto, a cam follower mounted for rotation on the lever, a second shaft mounted on the pair of the brackets, a second cylinder rotatably mounted on the second shaft, a cam link fixedly secured to the second cylinder, and a spring for urging the cam link to always contact with the cam follower.

1 Claim, 6 Drawing Figures

OPERATING FORCE TRANSMITTING APPARATUS

BACKGROUND OF THE INVENTION

This invention relates to an operating force transmitting apparatus for transmitting the operating force exerted on a lever or pedal to an actuating member such as a brake or clutch.

The driving or operating control of construction vehicles includes the control of transmission of the power developed by the engine by engaging and disengaging a main clutch, the control of steering of the vehicle by means of a steering clutch and the control of braking the vehicle by means of a brake. Such operating forces are, in general, transmitted by a manually operated lever or pedal through an operating force transmitting arrangement including a mechanical linkage means to a main clutch, steering clutch or a brake.

The above-mentioned operating force transmitting arrangement adapted to be actuated by operating a lever or pedal is generally constructed to have a proper lever ratio so as to reduce the manual operating force. For this purpose, such operating force transmitting arrangement is usually provided with a mechanical toggle means or hydraulic booster.

The operating force transmitting arrangement designed to determine the operating force by a lever ratio without using the mechanical toggle means is advantageous in its simple construction and low cost, but suffers from the following disadvantages.

For example, in the case of the brake pedal, even if the pedal is depressed, because of the predetermined lever ratio and the increased idle stroke of the pedal caused by the weardown of the brake lining, it is difficult to render the brake operative. Also, even if the brake becomes engaged, it is difficult to keep it depressed.

Further, because the lever ratio remains unchanged irrespective of the stroke of the brake pedal, a large depressing force is required for actuating the brake. Stating in brief, since the stroke of the brake pedal and the stroke of the brake actuating member vary in a generally fixed relationship, it is necessary for the brake pedal to have an idle stroke corresponding to the idle stroke of the brake actuating member.

Therefore, it is necessary to step down the brake pedal over a large stroke until the brake is actuated, and when the brake becomes operative the brake pedal is moved away from the operator's seat so as to make the depression of the pedal difficult, and therefore the brake cannot be actuated satisfactorily and smoothly. Further, since it is impossible to increase the lever ratio during braking of the vehicle, a large depressing force is required.

Moreover, such arrangement is disadvantageous in that the stroke (or the lever ratio) of the brake actuating member cannot be varied optionally against the stroke of the brake pedal, and the depressing force cannot be changed optionally.

The operating force transmitting arrangement using the hydraulic booster can overcome the problems concerning the operating force and the operating stroke, however, is disadvantageous in that it is complicated in construction and expensive.

SUMMARY OF THE INVENTION

It is therefore an object of the present invention to provide an operating force transmitting apparatus to be used for brake or clutch operation of a vehicle which is capable of reducing the operating force with a simple construction.

Another object of the present invention is to provide an operating force transmitting apparatus to be used for brake or clutch operation of a vehicle wherein the operating force can be reduced as an operating member such as a brake pedal is depressed. In accordance with an aspect of the present invention, there is provided an operating force transmitting apparatus to be used for brake or clutch operation of a vehicle, comprising:

a frame of the vehicle;

a pair of brackets fixedly secured to said frame;

first shaft means mounted on said pair of brackets astride thereto;

first cylinder means rotatably mounted on said first shaft means, said first cylinder means having an operating member and a lever fixedly secured thereto;

cam follower means mounted for rotation on said lever;

second shaft means mounted on said pair of brackets astride thereto;

second cylinder means rotatably mounted on said second shaft means;

cam link means fixedly secured to said second cylinder means; and spring means for urging said cam link means to always contact with said cam follower means in such a manner that the contact point of said cam link means and said cam follower means is continuously varied as said operating member is moved.

The above and other objects, features and advantages of the present invention will be readily apparent from the following description taken in conjunction with the accompanying drawings.

DETAILED DESCRIPTION OF THE INVENTION

Figure 1:
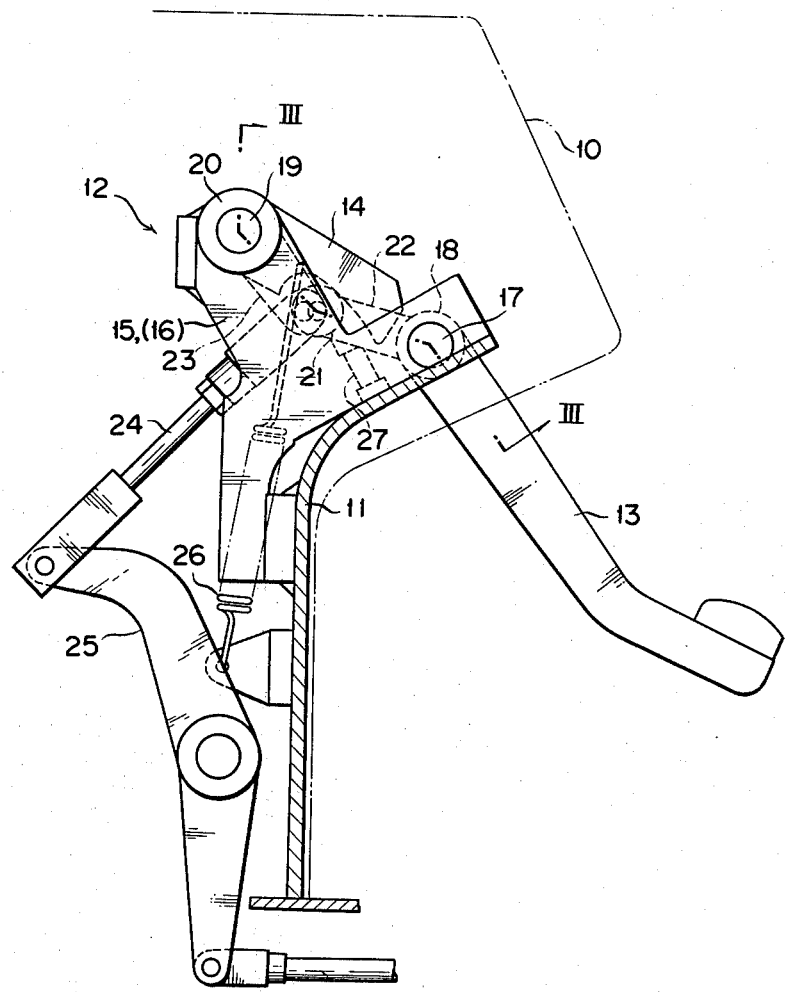
FIG. 1 is a side elevational view of an operating force transmitting apparatus according to the present invention.
Figure 2:
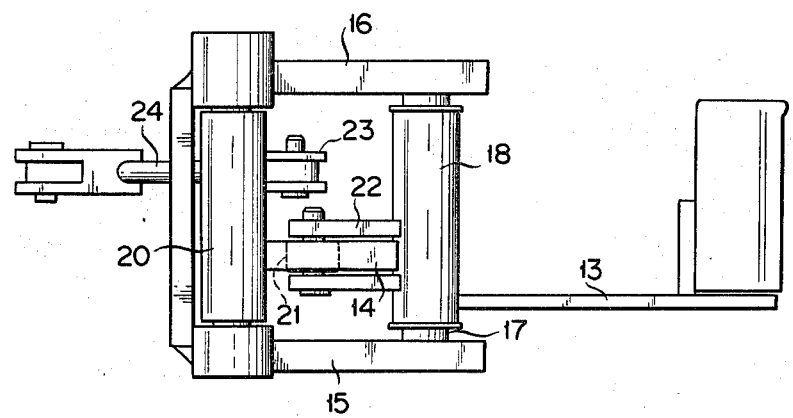
FIG. 2 is a plan view of FIG. 1.
Figure 3:
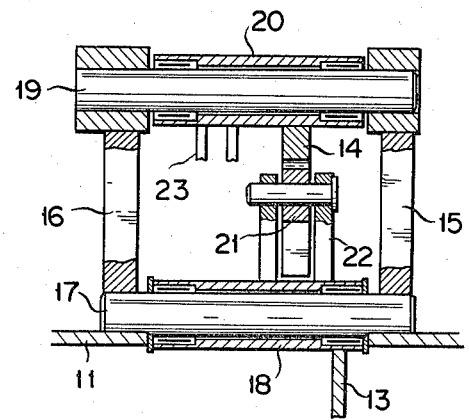
FIG. 3 is a cross-sectional view taken along the line III—III of FIG. 1.

The present invention will now be described below by way of example only with reference to the accompanying drawings.

Reference numeral 10 denotes a dash-board of a construction vehicle such as a bulldozer or the like. Mounted inside the dash-board 10 is a frame 11 to which an operating force transmitting apparatus 12 of the present invention is fitted.

The operating force transmitting apparatus comprises a first transmitting apparatus including an operating member 13 (which is a pedal in the illustrated example, but which may be a lever) and a second transmitting apparatus including a cam link member 14.

The above-mentioned operating member 13 and cam link member 14 are carried by a pair of brackets 15 and 16 fixedly secured to the frame 11 at a predetermined space interval.

Detachably mounted on the brackets 15 and 16 are a first stationary shaft 17 and a second stationary shaft 19 which, in turn, carry for rotation a first cylinder means 18 and a second cylinder means 20, respectively. The operating member 13 is fixedly secured to the first cylinder means 18 and can be oscillated freely relative to the stationary shaft 17. The first cylinder means 18 includes a lever 22 having a roller or cam follower 21 fitted to the leading end thereof for transmitting the oscillatory motion of the operating member 13.

The cam link member 14 is fixedly secured to the second cylinder means 20 and can be oscillated freely relative to the second stationary shaft 19. The second cylinder means 20 has another lever 23 for transmitting the oscillatory motion thereof.

Connected to the lever 23 are links such as a rod 24 and an oscillating lever 25 etc, which are connected to a clutch or brake for effecting the control of the operation.

The first transmitting apparatus including the operating member 13 carried by the first cylinder means 18 and the second transmitting apparatus including the cam link member 14 carried by the second cylinder means 20 are assembled in such a manner that the cam link member 14 can engage with the lever 22 of the first cylinder means 18 so as to contact the cam follower 21.

Further, in order to keep always such contact condition and hold the first and second transmitting apparatuses at a predetermined inoperative or rest position, a tension spring 26 and a stopper 27 are provided.

The tension spring 26 is connected to the frame 11 and the cam link member 14 so as to turn the cam link member 14 clockwise and maintain always its contact with the cam follower 21. The stopper 27 serves to prevent the counterclockwise rotation of the operating member 13 at a predetermined position which is applied thereto through the cam follower 21.

Thus, under such condition, the first and second transmitting apparatuses take their stationary postures under inoperative condition.

Figure 4:
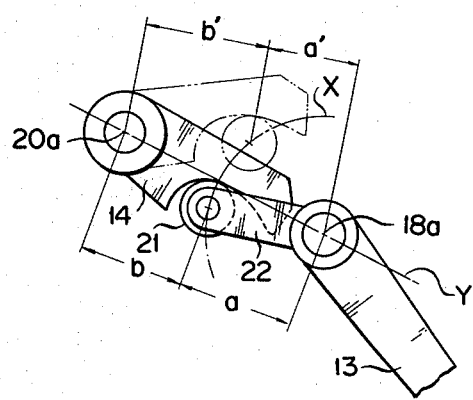
FIG. 4 is a schematical explanational view of the operational principle of the present invention.
Figure 5:
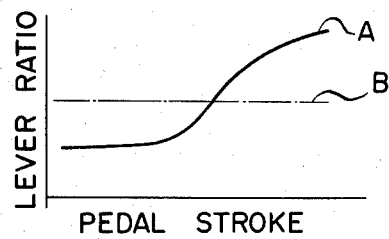
FIG. 5 is a diagram showing a relationship between the pedal stroke and the lever ratio.

When the operating member 13 is turned, the point of contact between the cam link member 14 and the cam follower 21 will change, and such change in the contact point will increase or decrease the lever ratio (b/a). (Refer to FIGS. 4 and 5.) In FIG. 5, a line A shows lever ratio of the present invention and a line B shows that of the conventional apparatus.

Therefore, when it is desired to reduce the idle stroke of the operating member 13, it can be done by reducing the lever ratio during the actuation thereof, and the lever ratio is increased with the increase in the stroke so that a large actuating force can be obtained by applying a small operating force.

Further, by using different shapes of cam link member 14, the lever ratio can be adjusted and the operating force can be adjusted easily.

Stating briefly, upon manipulating the operating lever 13, the cam follower 21 will turn along a circular arc locus X drawn about a turning center 18a of the first cylinder means 18. The cam link member 14 is turned by the cam follower 21 about the center of the second cylinder means 20, and so the lever ratio (b/a) will reduce when the cam follower 21 is moved below a straight line Y connecting the turning centers 18a and 20a. On the contrary, when the cam follower 21 is moved above the straight line Y, the lever ratio will increase.

Figure 6:
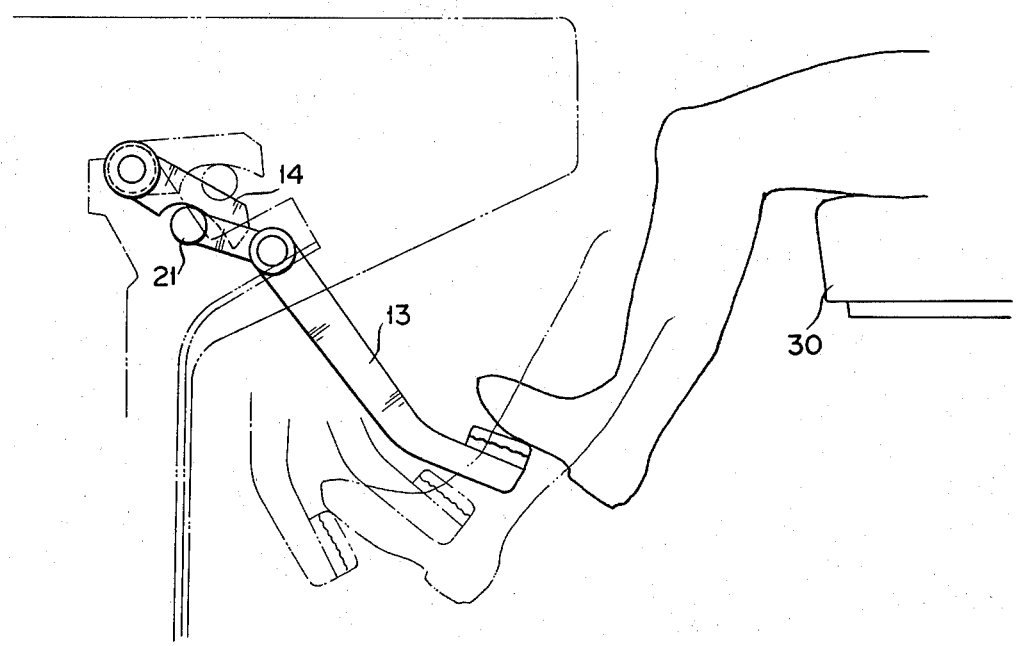
FIG. 6 is a schematic explanational view showing how the apparatus is operated as a pedal is depressed.

Therefore, during the idle stroke, the cam follower 21 will occupy its lower position, and during the effective stroke such as the brake actuation, it will occupy its upper position. As shown in FIG. 6, under inoperative condition, the operating member 13 (such as brake pedal) will be located near the operator's seat 30 so that the operator can depress the operating member easily. As the operating member 13 is depressed continuously, it will be moved away from the operator's seat 30 so as to make the depression difficult. However, since the lever ratio will increase, the operating force transmitted to the actuating member is multiplied and also the stroke of the actuating member is increased.

Therefore, the actuating member can be actuated or controlled smoothly and easily by a small depressing force with a small depressing stroke of the operating member 13.

In view of the foregoing, according to the present invention, the arrangement is made such that the lever ratio will change in response to the stroke of the operating member 13 so that the idle stroke of the operating member 13 can be reduced and the required operating force can be reduced with the increase in the lever ratio.

It is to be understood that the above description is by way of example only, and that details for carrying the invetion into effect may be varied without departing from the scope of the invention claimed.

What I claim is:

1. An operating force transmitting apparatus to be used for brake or clutch operation of a vehicle, comprising:
    a frame of the vehicle;
    a pair of brackets fixedly secured to said frame;
    first shaft means mounted on said pair of brackets astride thereto;
    first cylinder means rotatably mounted on said first shaft means, said first cylinder means having an operating member and a lever fixedly secured thereto;
    cam follower means mounted for rotation on said lever;
    second shaft means mounted on said pair of brackets astride thereto;
    second cylinder means rotatably mounted on said second shaft means;
    cam link means fixedly secured to said second cylinder means;
    spring means connected to said frame and said cam link means for urging said cam link means to always contact with said cam follower means in such a manner that the contact point of said cam link means and said cam follower means is continuously varied as said operating member is moved;
    rod means fixedly secured to said second cylinder means; and
    linkage means pivotally connected at one end thereof to said rod means, the other end of which is connected to a member to be controlled and operated.

* * * * *